US006428879B1

(12) United States Patent
Hansel et al.

(10) Patent No.: US 6,428,879 B1
(45) Date of Patent: Aug. 6, 2002

(54) ENCODER STRIP WITH DIMENSIONAL STABILITY AND INK RESISTANCE PROPERTIES

(75) Inventors: Gregory A. Hansel, Richfield; Bryan L. Hansel, Lakeville; Donald C. Hansel, Burnsville; Jeffrey J. Johnson, Minneapolis, all of MN (US)

(73) Assignee: Encoder Science Technology, LLC, Eagan, MN (US)

( * ) Notice: Subject to any disclaimer, the term of this patent is extended or adjusted under 35 U.S.C. 154(b) by 0 days.

(21) Appl. No.: 09/416,177

(22) Filed: Oct. 11, 1999

(51) Int. Cl.[7] .......................... B32B 27/14; B43L 13/00; G01D 15/16

(52) U.S. Cl. ...................... 428/195; 33/18.1; 346/140.1

(58) Field of Search .......................... 428/195; 33/18.1; 346/140.1

(56) References Cited

U.S. PATENT DOCUMENTS 4,509,063 A * 4/1985 Sugitani et al. ............. 346/140
4,612,875 A * 9/1986 Keable ........................ 118/670
5,190,608 A * 3/1993 Darcy et al. ............... 156/73.4
5,276,970 A * 1/1994 Wilcox et al. ............... 33/18.1
5,549,999 A * 8/1996 Swain et al. ................ 430/127
5,714,265 A * 2/1998 Meguriya et al. ........... 428/413

* cited by examiner

*Primary Examiner*—Cynthia H. Kelly
*Assistant Examiner*—L Ferguson
(74) *Attorney, Agent, or Firm*—Gray, Plant, Mooty, Mooty & Bennett, P.A.

(57) ABSTRACT

An encoder strip with dimensional stability and ink resistance properties. The encoder strip has a length, width, surface, thickness, and one or more markings per unit of length. A coating having a thickness between about 2 microns and about 4 microns and is distributed substantially uniformly over the surface of the element. The coating is configured on the element as substantially translucent to one or more light wavelengths and is adapted to: (1) form a membrane to substantially prevent ink absorption into the element or adsorption to the surface of the element; and (2) provide dimensional stability to the element resulting from interaction of temperature and humidity.

9 Claims, 1 Drawing Sheet

ENCODER STRIP WITH DIMENSIONAL STABILITY AND INK RESISTANCE PROPERTIES

BACKGROUND OF THE INVENTION

The present invention relates generally to encoder strip having dimensional stability and ink resistance properties for use in a high resolution laser, ink-jet printer, plotter, and in wide-format printers or plotters.

U.S. Pat. No. 5,941,649, entitled, Method For Fabricating A Registration Guide For A Wide-Format Printer Or Plotter, relates to a method for fabricating an encoder containing the intended integer number of registration markings (and spaces) per unit distance, over the correct length of that entire encoder. The method is practiced by producing a template having the desired number of registration indices at reasonably exact tolerances—but at widths and spacing less than or greater than intended for the registration markings, and therefore having an overall length less than or greater than that of the encoder—and using the template to project an image onto a substrate at a suitable scaling factor to form the encoder having the correct widths and spacing of the registration markings on that substrate. The template may be a wholly computer-generated and memory-resident virtual image, or may be imprinted upon a tangible intermediate medium and transferred to the substrate using a projection technique. The scaling process may be accomplished using mechanical, optical, or photochemical techniques, as well as combinations thereof.

U.S. Pat. No. 4,722,297, entitled, Film Coater, relates to a coater that applies ultraviolet curable coating material to the opposite sides of roll film by a double-sided coater which employs offset coating rolls and smoothing bars. A splice detector responds to the occurrence of a splice upstream of the coater and causes the splice region to move through the coater without applying coating material to the splice region, by lifting the emulsion side of the film off of the coating roll as the splice passes and by temporarily and sequentially interrupting the operation of the smoothing bars and the offset applicator roller on the non-emulsion or base side, concurrently with the passage of the splice therepast. In a second embodiment, the film is lifted by lifting bars off of both coating rolls and tension on the film is concurrently decreased in the coater to prevent marking of the surface of the coated film by the final smoothing bars.

U.S. Pat. No. 4,612,875, entitled, Film Coater, relates to a coater that applies ultraviolet curable coating material to the opposite sides of roll film by a double-sided coater which employs offset coating rolls and smoothing bars. A splice detector responds to the occurrence of a splice upstream of the coater and causes the splice region to move through the coater without applying coating material to the splice region, by lifting the emulsion side of the film off of the coating roll as the splice passes and by interrupting the operation of the smoothing bars and the offset applicator roller on the non-emulsion or base side, concurrently with the passage of the splice therepast.

U.S. Pat. No. 4,447,468, entitled, Photographic Film Coating Apparatus And Method, relates to a spindled photographic film discs are coated with an ultraviolet light curable protective coating apparatus which receives a developer spindle carrying a plurality of film discs at a receiving station. Carry-in arms transfer the spindle into a coating station through a door and deposit the spindle at a location where the lower films on the stacked discs are partially submerged in a pool of coating liquid. A drive gear engages a spur gear on the spindle and slowly rotates the spindle for applying the coating evenly to the discs. Carry-over arms engage the spindle and carry it about the circumference of the drive gear, first lifting the spindle above the coating material and then causing the spindle to be spun at a relatively high rate for removing excess material from the discs. The carry-over arms thereafter transport the spindle through a second door and into an ultraviolet curing region while maintaining the rotation of the discs during curing. The carry-over arms thereafter deposit the spindle onto a carry-out conveyor where the spindle may be removed from the apparatus. The method includes the steps of partially lowering the film disc carried on a spindle to submerge the discs in a pool of coating material, elevating the spindle above the pool and rotating the same to spin off excess coating material, moving the spindle out of the coating region and into an ultraviolet light curing region while continuing the rotation of the spindle and the discs thereto to provide for even curing throughout the film areas of the spindle, and thereafter removing the spindle from the ultraviolet region.

U.S. Pat. No. 4,049,861, entitled, Abrasion Resistant Coatings, relates to abrasion resistant coatings comprising epoxy-terminated silanes cured in the presence of highly fluorinated aliphatic sulfonic and sulfonylic catalysts are solvent and abrasion resistant.

All documents cited herein, including the foregoing, are incorporated herein by reference in their entireties for all purposes.

SUMMARY OF THE INVENTION

The present invention is directed to encoder strips fabricated from a polymer sheet or film such as Mylarg® and a coating disposed on the encoder strip for dimensional stability and ink resistance. The markings on these polymer film encoder strips may be imprinted in a variety of ways, however the ultimate accuracy of the encoder strip is limited by the precision of the imprinting process or apparatus. High precision printing requires accuracy and an encoder strip must retain dimensional stability and remain substantially unclouded by ink residue for precision interaction with printing heads which rely on the markings. Resistance to ink clouding of the encoder strip is especially important in printing environments using agressive ink chemicals. In the past, ink clouded encoder strips have been routinely replaced at expense to the users.

The coatings advantageously limit damage and deformation of the encoder strip in a environmentally hostile environment due to factors such as humidity and ink residue. Deformation may result in contact between the print head and encoder strip which may damage one or both, or slow the print head due to friction. Subsequent stretching or distortion of the encoder strip would require periodic calibration. Clouding of the encoder by ink reside may cause printing, inaccuracies.

In sum, the invention relates to an encoder strip with dimensional stability and ink resistance properties including an element for use as an optical encoder strip. The element has a length, width, surface, thickness, and one or more markings per unit of length over at least a portion of the element. A coating has a thickness between about 2 microns and about 4 microns and is distributed substantially uniformly over the surface of the element. The coating is configured on the element as substantially translucent to one or more light wavelengths and is adapted to: (1) form a membrane to substantially prevent ink absorption into the element or adsorption to the surface of the element; and (2) provide dimensional stability to the element resulting from interaction of temperature and humidity. The coating may be about 3 microns thick. The coating and element may be configured such that: (1) the one or more markings as measured therebetween have a first dimension at a first time and a second dimension at a second time and the first and second dimension are substantially the same for maintaining a substantial precision in a resolution of the one or more markings; and (2) the one or more markings as measured have a first resolution at a first time and a second resolution at a second time and the first and second resolution are substantially the same for maintaining a substantial precision in a resolution of the one or more markings. The encoder strip may be adapted for use as a registration reference for the print head of a printer. The encoder strip may include Mylar®. The markings may be generally parallel, spaced-apart opaque line segments alternating with generally transparent spaces. The encoder strip may be adapted for use on a wide-format printer or a wide-format plotter. The coating may substantially excludes moisture from absorbing into the encoder strip. The encoder strip may have a length of between about 40 inches and about 120 inches. The encoder strip may be used in an image reproduction system.

Still other objects and advantages of the present invention and methods of construction of the same will become readily apparent to those skilled in the art from the following detailed description, wherein only the preferred embodiments are shown and described, simply by way of illustration of the best mode contemplated of carrying out the invention. As will be realized, the invention is capable of other and different embodiments and methods of construction, and its several details are capable of modification in various obvious respects, all without departing from the invention. Accordingly, the drawing and description are to be regarded as illustrative in nature, and not as restrictive.

DETAILED DESCRIPTION OF THE INVENTION

Figure 1:
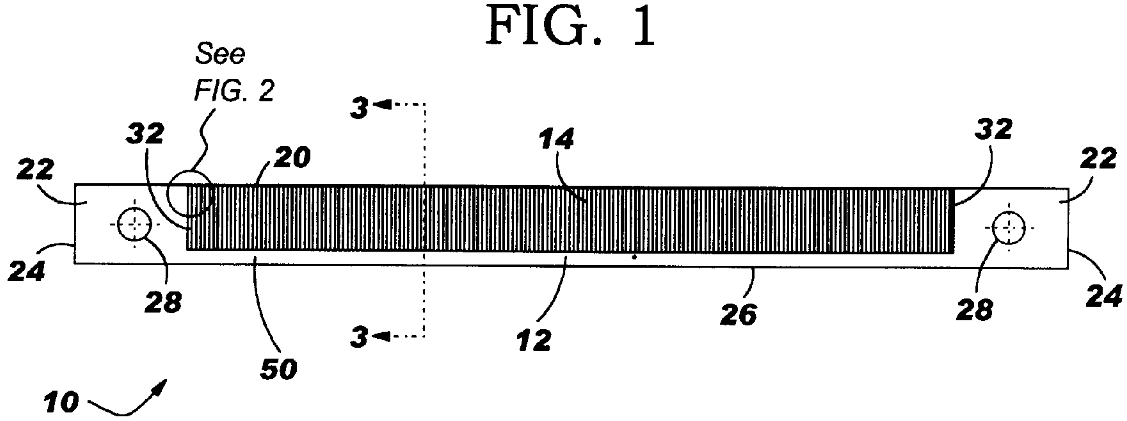
FIG. 1 is a top plan view of an encoder strip embodiment fabricated according to this invention.
Figure 2:
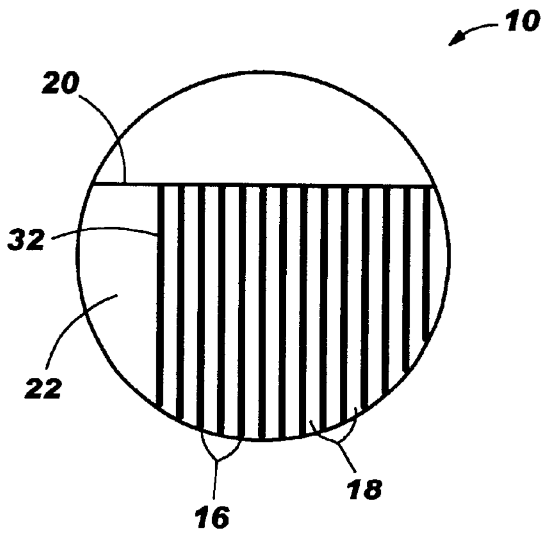
FIG. 2 is a detail view of the portion of the encoder strip of FIG. 1 shown circled in FIG. 1.
Figure 3:
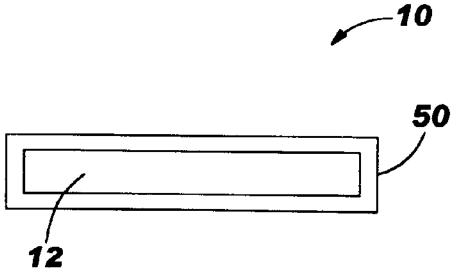
FIG. 3 is a cross-sectional view of the encoder strip of FIG. 1 taken along the line 3—3.

FIGS. 1–3 illustrate the encoder strip 10 of the present invention. Referring particularly to FIGS. 1 and 2, the illustrative encoder strip 10 is shown comprising a substrate material 12 defining a region 14 containing a multiplicity of markings or lines 16 alternating with an equivalent multiplicity of spaces 18. The substrate material 12 is preferably a thin polymeric film such as light sensitive Mylar® film having nominal thickness of 4 to 8 mil. The substrate 12 is generally clear or transparent apart from the lines 16—which are black—and is inherently scratch resistant and antistatic, or suitably coated to provide these properties.

One particular coating chemical has been identified as 3M Scotchgard Film Protector II™. This particular coating chemical finds utility in the protective coating of photographic and cinematographic films, particularly celluloid films. A predominant polymeric compound of this coating chemical is 3-(trimethoxysilyl) propyl glycidyl ether. This particular coating is applied as a wet film to the film substrate and subsequently UV heat cured. Alternative coatings and coating technologies (dry film coating, sputtering, spray coating, lamination processes, etc.) may also find applicability to the present invention herein.

FIG. 3 references a generally uniform coating 50 disposed on the surface of the encoder strip 10 to provide dimensional stability and ink resistant properties. The multiplicity of markings or lines 16 are preferably generally parallel with one another and equidistantly spaced along and adjacent one longitudinal edge 20 of the substrate 12, with an open region 22 devoid of lines 16 positioned on each side of the region 14 and disposed proximate to each opposing end edge 24 of the substrate 12. The region 14 of lines 16 preferably traverses only partially across the width of the substrate 12, leaving the opposing longitudinal edge 26 open or devoid of lines 16.

In overview, the encoder strip 10 is intended to have an integer number of registration markings or lines 16 per unit linear distance—such as 150 lpi in this example-with these lines 16 separated by the equivalent (n−1) spaces 18 plus an additional space 18 disposed on one of the terminal ends 32 of the region 14 of lines 16. In this exemplary embodiment, the lines 16 and spaces 18 each have a substantially equal width of one three-hundredth of an inch (1/300") which may be expressed as an infinite decimal (0.003333" . . . ). Over the length of the region 14, the total number of lines 16 can be calculated as the length in units of distance times the lines 16 per unit distance. In an encoder strip of 46" width, the total number of lines 16 would be 6750, and twice that for a 90" encoder strip 10. The actual length of the encoder strip 10 would normnally be greater than the length of the region 14 of lines 16 by the lengths of the two open regions 22 disposed proximate to each terminal end of the region 14 of lines 16, however for purposes of convenience and clarity of terminology, the length of the encoder strip 10 may be readily interchanged with the length of the region 14 of lines 16. Thus, a 45" encoder strip 10 has a region 14 of lines 16 and spaces 18 extending over a length of 45", while the substrate 12 actually has a length in excess of 45".

In practice a plurality of the encoder strips 10 are fabricated by imprinting a large sheet of film substrate 12 which is subsequently scored into a plurality of individual encoder strips 10. The method 10 may also be practiced using a template 30 having a length which is a subset of the intended length of the corresponding encoder strip 10 which is then offset in a repeatable manner to generate a longer encoder strip 10, however this process would require very accurate alignment and registration between the preceding and succeeding template positions, and is unduly burdensome and time-consuming for fabricating encoder strips 10 of the type used in the exemplary applications as described herein.

The above described embodiments of the invention are merely descriptive of its principles and are not to be considered limiting. Further modifications of the invention herein disclosed will occur to those skilled in the respective arts and all such modifications are deemed to be within the scope of the invention as defined by the following claims.

What is claimed is:

1. An optical encoder strip with dimensional stability and ink resistance properties comprising:

a clear thin polymer film element having a length, width, surfaces, and thickness;

said element having a region located between the lengthwise ends, with a plurality of registration markings including an integer number of opaque registration line segments per linear distance that are generally parallel to each other and equidistantly spaced apart along an edge of the element, alternating with generally transparent spaces;

a clear coating having a thickness between about 2 microns and about 4 microns adhered to and substantially uniformly covering the surfaces of the element sufficiently to substantially exclude moisture from absorbing into the element;

wherein the coating is configured on the element as translucent to one or more light wavelengths and is adapted to : (1) substantially prevent ink absorption into the element or adsorption to the surface of the element; and (2) provide dimensional stability to the element resulting from interaction of heat and moisture.

2. The encoder strip of claim 1 wherein the coating is about 3 microns thick.

3. The encoder strip of claim 1 wherein the coating and element are configured such that the one or more markings as measured therebetween have a first dimension at a first time and a second dimension at a second time and the first and second dimension are substantially the same for maintaining a substantial precision in a resolution of the one or more markings.

4. The encoder strip of claim 1 wherein the coating and element are configured such that the one or more markings as measured have a first resolution at a first time and a second resolution at a second time and the first and second resolution are substantially the same for maintaining a substantial precision in a resolution of the one or more markings.

5. The encoder strip of claim 1 wherein the encoder strip is adapted for use as a registration reference for the print head of a printer.

6. The encoder strip of claim 1 wherein the encoder strip is adapted for use on a wide-format printer or a wide-format plotter.

7. The encoder strip of claim 1 wherein the encoder has a length of between about 40 inches and about 120 inches.

8. The encoder strip of claim 1 wherein the encoder strip is used in an image reproduction system.

9. The encoder strip of claim 1 wherein the coating comprises 3-(trimethoxysilyl) propyl glycidyl ether.

* * * * *